(12) United States Patent
Mochizuki et al.

(10) Patent No.: US 9,488,261 B2
(45) Date of Patent: Nov. 8, 2016

(54) HYDROSTATIC TRANSMISSION

(71) Applicant: Kanzaki Kokyukoki Mfg. Co., Ltd., Amagasaki-shi, Hyogo (JP)

(72) Inventors: Yasuhisa Mochizuki, Amagasaki (JP); Tomoyuki Tsuji, Amagasaki (JP); Tooru Oota, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 477 days.

(21) Appl. No.: 14/031,962

(22) Filed: Sep. 19, 2013

(65) Prior Publication Data

US 2014/0096515 A1   Apr. 10, 2014

(30) Foreign Application Priority Data

Oct. 4, 2012   (JP) .................. 2012-222159

(51) Int. Cl.
*F16D 31/02*   (2006.01)
*F16H 39/14*   (2006.01)
*F16H 57/04*   (2010.01)

(52) U.S. Cl.
CPC .......... *F16H 39/14* (2013.01); *F16H 57/0471* (2013.01)

(58) Field of Classification Search
CPC ............ F16H 57/0471; F16H 39/14
USPC ........................................ 60/456
See application file for complete search history.

(56) References Cited

U.S. PATENT DOCUMENTS

| | | | |
|---|---|---|---|
| 2005/0143215 A1* | 6/2005 | Fugel | F16C 19/46 475/331 |
| 2007/0219037 A1 | 9/2007 | Grochowski et al. | |
| 2010/0234113 A1* | 9/2010 | Drabek | F16H 57/043 464/7 |

FOREIGN PATENT DOCUMENTS

| | | |
|---|---|---|
| JP | H04-75265 U | 6/1992 |
| JP | 2009-079627 A | 4/2009 |
| JP | 2011-043202 A | 3/2011 |
| JP | 2012-7675 A | 1/2012 |

OTHER PUBLICATIONS

Machine Translation of Japanese Patent Publication 2012-007675.*

* cited by examiner

*Primary Examiner* — Thomas E. Lazo
*Assistant Examiner* — Daniel Collins
(74) *Attorney, Agent, or Firm* — Sterne, Kessler, Goldstein & Fox P.L.L.C.

(57) ABSTRACT

In a hydrostatic transmission (HST), a lubricating fluid passage is formed in an input shaft and has a pair of radially opposite lubricating fluid spill ports open at an outer peripheral surface of the input shaft. Both of the radially opposite lubricating fluid spill ports face a lubricated object of the HST. The lubricating fluid passage includes an axial fluid passage and a pair of radial fluid passages that are extended radially from the axial fluid passage to the outer peripheral surface of the input shaft so as to be radially opposite each other. Open ends of the respective radial fluid passages at the outer peripheral surface of the input shaft serve as the respective radially opposite lubricating fluid spill ports.

6 Claims, 7 Drawing Sheets

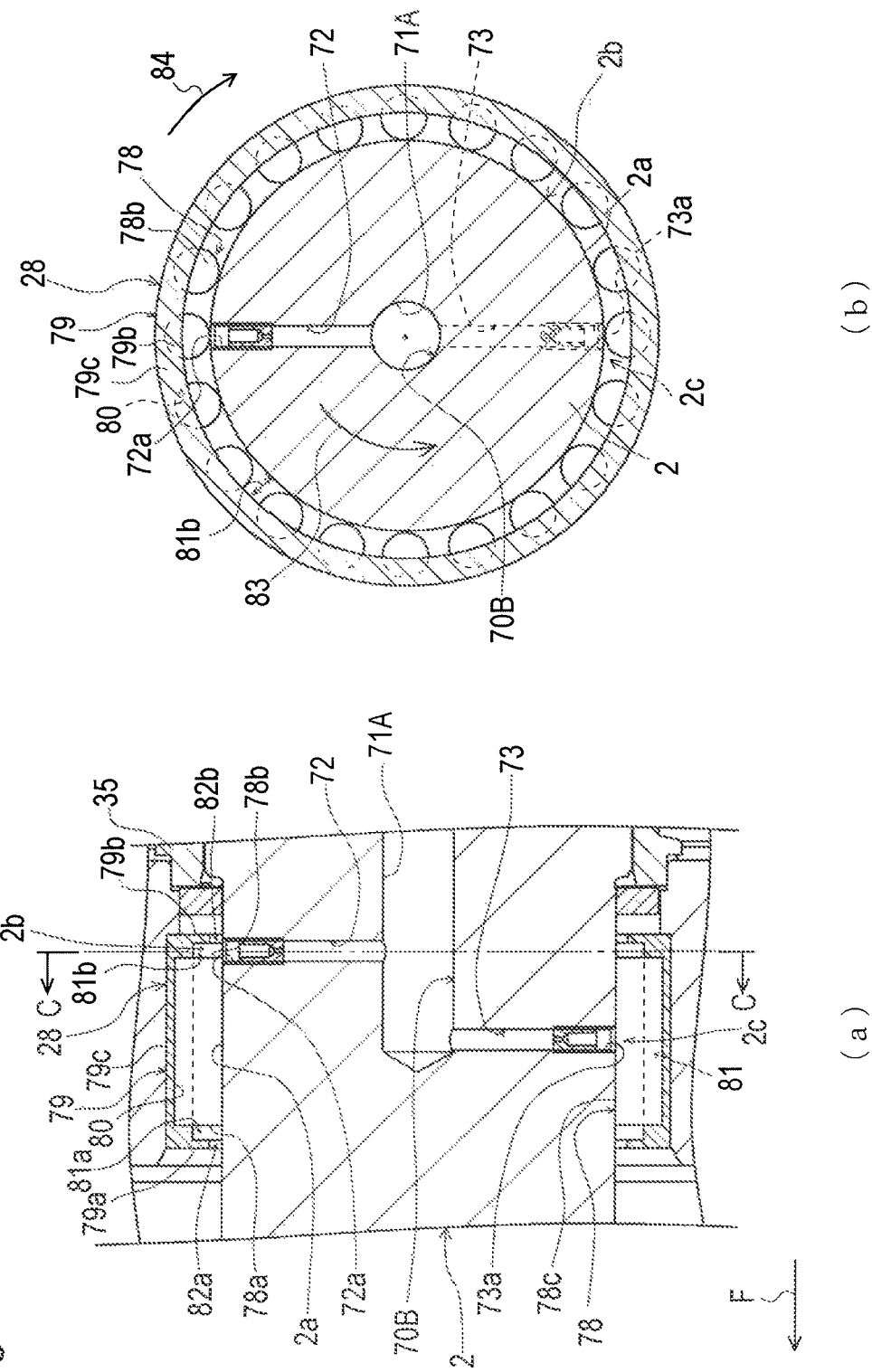

HYDROSTATIC TRANSMISSION

BACKGROUND OF THE INVENTION

1. Field of the Invention

The present invention relates to a hydrostatic transmission (hereinafter, referred to as "HST"). Especially, the present invention relates to a lubricating fluid support system for a lubricated object, typically a bearing, e.g., a roller bearing provided in the HST.

2. Related Art

A conventional HST as disclosed by JP 2012-7675 A includes an input shaft and a plunger block fixed on the input shaft. The plunger block is formed therein with pump cylinder bores, motor cylinder bores and a pair of main fluid passages fluidly connecting the pump cylinder bores to the motor cylinder bores. Pump plungers are reciprocally fitted into the respective pump cylinder bores in the plunger block and a pump swash plate is disposed on one axial side of the plunger block so as to abut against heads of the pump plungers projecting outward from the plunger block, so that the pump plungers and the pump swash plate constitute a hydraulic pump of the HST. Motor plungers are reciprocally fitted into the respective motor cylinder bores in the plunger block and a motor swash plate is disposed on another axial side of the plunger block opposite the pump swash plate so as to abut against heads of the motor plungers projecting outward from the plunger block opposite the heads of the pump plungers, so that the motor plungers and the motor swash plate constitute a hydraulic motor of the HST. The motor swash plate is fitted on the input shaft rotatably relative to the input shaft and is integrated with an output rotary member of the HST, which is drivingly connected to a gear transmission for driving an axle of a vehicle, for example.

In this regard, a needle roller bearing is interposed between an outer peripheral surface of the input shaft and an inner peripheral surface of the motor swash plate so as to support the motor swash plate rotatably relative to the input shaft. More specifically, the needle roller bearing includes needle rollers and a roller retaining ring that holds the needle rollers in the inside thereof. The needle rollers abut against the outer peripheral surface of the input shaft, and an outer peripheral surface of the roller retaining ring abuts against the inner peripheral surface of the motor swash plate. The needle roller bearing has an inside gap space between the roller retaining ring and the outer peripheral surface of the input shaft so as to accommodate the rollers in the inside gap space.

The plunger block is further formed therein with pump valve bores fluidly connected to the respective pump cylinder bores and with motor valve bores fluidly connected to the respective motor cylinder bores. Pump spool valves are reciprocally fitted in the respective pump valve holes and motor spool valves are reciprocally fitted in the respective motor valve holes so that each spool valve is operable to fluidly connect or disconnect the corresponding cylinder bore to and from the main fluid passages. A pump spool cam is fitted to the input shaft between the plunger block and the pump swash plate to engage with the pump spool valves corresponding to the respective pump cylinder bores. A motor spool cam is fitted to the input shaft between the plunger block and the motor swash plate to engage with the motor spool valves corresponding to the respective motor cylinder bores.

The needle roller bearing is provided with an outside gap space around the input shaft between the motor spool cam and the needle roller bearing, and a lubricating fluid spill port is open at the outer peripheral surface of the input shaft so as to face the outside gap space of the needle roller bearing. The lubricating fluid spill port is fluidly connected to a lubricating fluid passage formed in the input shaft. A charge fluid passage for supplementing hydraulic fluid to the main fluid passages is also formed in the input shaft and is also fluidly connected to the lubricating fluid passage in the input shaft. Therefore, surplus fluid from the charge fluid passage flows to the outside gap space via the lubricating fluid passage and port so as to lubricate the needle roller bearing.

The torque and rotary speed of the motor swash plate serve as the output torque and rotary speed of the HST, and they sometimes change quickly. In this case, the lubricating fluid cannot reach the needle roller bearing to make slicks on the needle rollers of the needle roller bearing because of a distance between the inside gap space of the needle roller bearing and the lubricating fluid spill port facing the outside gap space of the needle roller bearing. Further, if the load on the motor swash plate integrated with the output rotary member of the HST is heavy, the rotary speed of an engine driving the input shaft of the HST is reduced so as to reduce the hydraulic pressure in the charge fluid passage in the input shaft, so that the reduced hydraulic pressure is insufficient to fill the lubricating fluid to the outside and inside gap spaces of the needle roller bearing. Such a lack of lubricating fluid supplied to the needle roller bearing wears or damages the needle rollers of the needle roller bearing, thereby shortening the life of the needle roller bearing.

SUMMARY OF THE INVENTION

A first object of the invention is to provide an HST provided with a lubricated object prevented from lacking lubricating fluid regardless of sudden change of torque or rotary speed caused by an optional speed changing operation or sudden speed reduction of an input shaft caused by a heavy load.

To achieve the first object, an HST according to the invention comprises an input shaft, a plunger block, pump plungers, a pump swash plate, a hydraulic motor, a lubricated object and a lubricating fluid passage. Axial and radial directions of any component or portion in the HST are defined to coincide with axial and radial directions of the input shaft. The plunger block is fixed on the input shaft. The pump plungers are disposed in the plunger block. The pump swash plate is disposed on one axial side of the plunger block so as to contact heads of the pump plungers projecting from the plunger block. The hydraulic motor is driven by hydraulic fluid pressurized by the pump plungers rotating together with the plunger block and the input shaft. The lubricating fluid passage is formed in the input shaft and has a pair of radially opposite lubricating fluid spill ports open at an outer peripheral surface of the input shaft. Both of the lubricating fluid spill ports face the lubricated object. The lubricating fluid passage includes an axial fluid passage extended axially and a pair of radial fluid passages extended radially from the axial fluid passage to the outer peripheral surface of the input shaft so as to be radially opposite each other. Open ends of the respective radial fluid passages at the outer peripheral surface of the input shaft serve as the respective radially opposite lubricating fluid spill ports.

Therefore, during rotation of the input shaft, the HST surely supplies the lubricated object with lubricating fluid spilled out from the respective lubricating fluid spill ports so as to surely lubricate the lubricated object regardless of sudden change of torque or rotary speed of the hydraulic motor caused by a speed control operation of the HST or so on or sudden speed reduction of the input shaft caused by a heavy load applied on the hydraulic motor, thereby developing the endurance of the lubricated object against wearing or damaging and thereby reducing the maintenance count of the HST.

Further, therefore, the pair of radial fluid passages and the pair of lubricating fluid spill ports double lubricating fluid supplied to the lubricated object. Further, to flood the outer peripheral surface of the input shaft in the entire peripheral range of the input shaft with lubricating fluid, if lubricating fluid spilled out from each of the lubricating fluid spill ports flows to only a half peripheral distance on the outer peripheral surface of the input shaft along with the rotation of input shaft, the lubricating fluid reaches the radially opposite position on the outer peripheral surface of the input shaft corresponding to the other of the lubricating fluid spill ports, thereby efficiently lubricating the lubricated object in the peripheral direction of the input shaft.

Preferably, both of the radially opposite lubricating fluid spill ports are disposed at the same axial position.

Therefore, if lubricating fluid spilled out from each of the lubricating fluid spill ports flows to only a half peripheral distance on the outer peripheral surface of the input shaft along with the rotation of input shaft, the lubricating fluid surely reaches the other of the lubricating fluid spill ports without axial deviation, thereby further efficiently lubricating the lubricated object in the peripheral direction of the input shaft.

Preferably, the lubricated object has opposite axial end potions and an inside section between the axial end portions, and both of the radially opposite lubricating fluid spill ports disposed at the same axial position face the inside section of the lubricated object adjacent to one of the axial end portions of the lubricated object.

Therefore, lubricating fluid spilled out from the respective lubricating fluid spill ports directly accesses the inside section of the lubricated object and is guided by the lubricated object while rotation of the input shaft so as to smoothly flow along the outer peripheral surface of the input shaft in the peripheral direction of the input shaft according to rotation of the input shaft, thereby rapidly flooding the outer peripheral surface of the input shaft in the entire peripheral range. Further, although the lubricating fluid spilled from the lubricating fluid spill ports is adjacent to the axial end portion of the lubricated object, the lubricating fluid can be axially spread on the outer peripheral surface of the input shaft to quickly flood the entire lubricated object in the axial range.

Alternatively, preferably, the lubricated object has opposite axial end potions and an inside section between the axial end portions, and both of the radially opposite lubricating fluid spill ports disposed at the same axial position face an axial middle portion of the inside section of the lubricated object.

Therefore, lubricating fluid spilled out from the lubricating fluid spill ports directly splashes at the axial middle portion of the inside section of the lubricated object and is guided by the lubricated object while rotation of the input shaft so as to smoothly flow along the outer peripheral surface of the input shaft in the peripheral direction of the input shaft according to rotation of the input shaft, thereby rapidly flooding the outer peripheral surface of the input shaft in the entire peripheral range. Further, the lubricating fluid directly splashing at the axial middle portions of inside section of the lubricated object is quickly axially spread so as to efficiently flood the entire lubricated object in the axial range.

Alternatively, preferably, the radially opposite lubricating fluid spill ports are disposed at different axial positions.

Therefore, the arrangement of the lubricating fluid spill ports open at the different axial positions is advantageous for quickly flooding the lubricated object in the entire axial range because of cooperation of axial spreading of lubricating fluid from both of the axial offset lubricating fluid spill ports. The axial offset arrangement of the lubricating fluid spill ports does not seriously damage the effect of the radially opposite lubricating fluid spill ports for rapidly completing to flood the outer peripheral surface of the input shaft in the entire peripheral range if the axial offset distance between the lubricating fluid spill ports is small and the lubricating fluid spilled from each of the lubricating fluid spill ports at each of the axial positions is axially spread on the outer peripheral surface of the input shaft to some degrees so as to cover the small axial offset distance between the lubricating fluid spill ports while flowing along the outer peripheral surface of the rotating input shaft in the peripheral direction of the input shaft.

Preferably, one of the lubricating fluid spill ports disposed at one of the different axial positions faces the inside section of the lubricated object adjacent to one of the axial end portions of the lubricated object, and the other of the lubricating fluid spill ports disposed at the other of the different axial positions faces an axial middle portion of the inside section of the lubricated object.

Therefore, the radially opposite lubricating fluid spill ports disposed at the different axial positions are advantageous for lubricating the lubricated object if the lubricated object has eccentricity in the axial direction of the input shaft. If the eccentricity causes the lubricated object adjacent to the axial end portion to have an undesirably high surface pressure against the outer peripheral surface of the input shaft while the surface pressure of the axial middle portion of the inside section of the lubricated object being normal, lubricating fluid spilled from the lubricating fluid spill port adjacent to the axial end portion of the lubricated object splashes on the lubricated object adjacent to the axial end portion so as to reduce the surface pressure, thereby surely flooding the lubricated object in the entire axial direction. Conversely, if the axial middle portion of the inside section of the lubricated object has an undesirably high surface pressure caused by the eccentricity in the axial direction of the input shaft, the lubricating fluid spill port facing the axial middle portion of the inside section of the lubricated object has the benefit of reducing the surface pressure of the axial middle portion of the inside section of the lubricated object with lubricating fluid spilled therefrom and splashed on the lubricated object at the axial middle portion of the inside section thereof.

Preferably, the HST further comprises motor plungers and a motor swash plate. The motor plungers are disposed in the plunger block so as to be fluidly connected to the pump plungers. The motor swash plate is disposed on another axial side of the plunger block opposite the pump swash plate and contacts heads of the motor plungers projecting from the plunger block so as to constitute the hydraulic motor. The lubricated object is a bearing disposed on the outer peripheral surface of the input shaft so as to support the motor swash plate.

Therefore, in the HST having the pump and motor swash plates opposite each other with respect to the plunger block in the axial direction of the input shaft, the bearing serving as the lubricated object is efficiently and surely lubricated regardless of the sudden change of torque or rotary speed of the motor swash plate serving as the hydraulic motor caused by an optional speed changing operation or sudden speed reduction of the input shaft caused by a heavy load on the motor swash plate serving as the hydraulic motor.

A second object of the invention is to provide an HST provided with a roller bearing prevented from lacking lubricating fluid regardless of sudden change of torque or rotary speed caused by an optional speed changing operation or sudden speed reduction of an input shaft caused by a heavy load.

To achieve the second object, an HST according to the invention comprises an input shaft, a plunger block, pump plungers, motor plungers, a pump swash plate, a motor swash plate, a roller bearing and a lubricating fluid passage. Axial and radial directions of any component or portion in the HST are defined to coincide to axial and radial directions of the input shaft. The plunger block is fixed on the input shaft. The pump plungers and the motor plungers are disposed in the plunger block. The pump swash plate is disposed on one axial side of the plunger block so as to contact heads of the pump plungers projecting from the plunger block. The motor swash plate is disposed on another axial side of the plunger block opposite the pump swash plate so as to contact heads of the motor plungers projecting from the plunger block. The roller bearing is interposed between an outer peripheral surface of the input shaft and an inner peripheral surface of the motor swash plate. The roller bearing includes rollers and a roller retaining ring that holds the rollers in the inside thereof. The rollers contact the outer peripheral surface of the input shaft. The roller retaining ring contacts the inner peripheral surface of the motor swash plate at an outer peripheral surface thereof. The roller bearing has an inside gap space in the inside of the roller retaining ring along the outer peripheral surface of the input shaft to accommodate the rollers. The lubricating fluid passage is formed in the input shaft and has a lubricating fluid spill port open at the outer peripheral surface of the input shaft. The lubricating fluid spill port faces the inside gap space of the roller bearing.

Therefore, during rotation of the input shaft, the HST surely supplies the inside gap space of the roller bearing with lubricating fluid spilled out from the lubricating fluid spill port so as to surely lubricate the rollers held in the inside of the roller retaining ring regardless of sudden change of torque or rotary speed of the motor swash plate caused by a speed control operation of the HST or so on or sudden speed reduction of the input shaft caused by a heavy load applied on the motor swash plate, thereby developing the endurance of the roller bearing against wearing or damaging of the rollers and reducing the maintenance count of the HST.

Preferably, the lubricating fluid passage includes an axial fluid passage extended axially and a pair of radial fluid passages extended radially from the axial fluid passage to the outer peripheral surface of the input shaft so as to be radially opposite each other. Each of open ends of the radial fluid passages at the outer peripheral surface of the input shaft serves as the lubricating fluid spill port.

Therefore, the pair of radial fluid passages doubles the lubricating fluid spill ports so as to increase lubricating fluid supplied to the roller bearing. Further, to flood the outer peripheral surface of the input shaft in the entire peripheral range of the input shaft with lubricating fluid, if lubricating fluid spilled out from each of the lubricating fluid spill ports flows to only a half peripheral distance on the outer peripheral surface of the input shaft along with the rotation of input shaft, the lubricating fluid reaches the radially opposite position on the outer peripheral surface of the input shaft corresponding to the other of the lubricating fluid spill ports, thereby efficiently lubricating the roller bearing in the peripheral direction of the input shaft.

Preferably, both of the radially opposite lubricating fluid spill ports are disposed at the same axial position.

Therefore, if lubricating fluid spilled out from each of the lubricating fluid spill ports flows to only a half peripheral distance on the outer peripheral surface of the input shaft along with the rotation of input shaft, the lubricating fluid surely reaches the other of the lubricating fluid spill ports without axial deviation, thereby further efficiently lubricating the roller bearing in the peripheral direction of the input shaft.

Preferably, both of the radially opposite lubricating fluid spill ports disposed at the same axial position face an axial end portion of the inside gap space of the roller bearing between an axial end of the roller retaining ring and an axial end of each of the rollers.

Therefore, lubricating fluid spilled out from the lubricating fluid spill ports directly enters the axial end portion of the inside gap space and is guided by the roller retaining ring and the rollers while rotation of the input shaft so as to smoothly flow along the outer peripheral surface of the input shaft in the peripheral direction of the input shaft according to rotation of the input shaft, thereby rapidly flooding the outer peripheral surface of the input shaft in the entire peripheral range. Further, although the lubricating fluid spilled from the lubricating fluid spill ports into the axial end portion of the inside gap space does not mainly splash on surfaces of the rollers contacting the outer peripheral surface of the input shaft (hereinafter, referred to as "contact surfaces of the rollers"), the lubricating fluid can be axially spread on the outer peripheral surface of the input shaft to quickly flood the entire rollers because the rollers are adjacent to the axial end portion of the inside gap space.

Alternatively, preferably, both of the radially opposite lubricating fluid spill ports disposed at the same axial position face an axial middle portion of each of the rollers in the inside gap space.

Therefore, lubricating fluid spilled out from the lubricating fluid spill ports directly splashes on the axial middle portions of the contact surfaces of the rollers and is guided by the rollers while rotation of the input shaft so as to smoothly flow along the outer peripheral surface of the input shaft in the peripheral direction of the input shaft according to rotation of the input shaft, thereby rapidly flooding the outer peripheral surface of the input shaft in the entire peripheral range. Further, the lubricating fluid directly splashing on the contact surfaces of the axial middle portions of the rollers is quickly axially spread so as to efficiently flood the entire rollers.

Alternatively, preferably, the radially opposite lubricating fluid spill ports are disposed at different axial positions.

Therefore, the arrangement of the lubricating fluid spill ports open at the different axial positions is advantageous for quickly flooding the rollers in the entire axial range of the rollers because of cooperation of axial spreading of lubricating fluid from both of the axial offset lubricating fluid spill ports. The axial offset arrangement of the lubricating fluid spill ports does not seriously damage the effect of the radially opposite lubricating fluid spill ports for rapidly completing to flood the outer peripheral surface of the input shaft in the entire peripheral range if the axial offset distance between the lubricating fluid spill ports is small and the lubricating fluid spilled from each of the lubricating fluid spill ports at each of the axial positions is axially spread on the outer peripheral surface of the input shaft to some degrees so as to cover the small axial offset distance between the lubricating fluid spill ports while flowing along the outer peripheral surface of the rotating input shaft in the peripheral direction of the input shaft.

Preferably, one of the lubricating fluid spill ports disposed at one of the different axial positions faces an axial end portion of the inside gap space of the roller bearing between an axial end of the roller retaining ring and an axial end of each of the rollers, and the other of the lubricating fluid spill ports disposed at the other of the different axial positions faces an axial middle portion of each of the rollers in the inside gap space.

Therefore, the radially opposite lubricating fluid spill ports disposed at the different axial positions are advantageous for lubricating the roller bearing if the rollers of the roller bearing have eccentricity in the axial direction of the input shaft at the contact surfaces of the rollers. If the eccentricity causes end portions of the rollers adjacent to the axial end portion of the inside gap space to have undesirably high surface pressures against the outer peripheral surface of the input shaft while the surface pressures of the axial middle portions of the rollers being normal, lubricating fluid spilled from the lubricating fluid spill port facing the axial end portion of the inside gap space splashes on the end portions of the contact surfaces of the rollers adjacent to the axial end portion of the inside gap space so as to reduce the surface pressures of the end portions of the contact surfaces of the rollers, thereby surely flooding the contact surfaces of the rollers in the entire axial direction. Conversely, if the axial middle portions of the rollers have undesirably high surface pressures caused by the eccentricity in the axial direction of the input shaft, the lubricating fluid spill port facing the axial middle portions of the rollers has the benefit of reducing the surface pressures of the axial middle portions of the rollers with lubricating fluid spilled therefrom and splashed on the axial middle portions of the contact surfaces of the rollers.

Preferably, each of the rollers of the roller bearing has its own axis that is extended in the axial direction of the input shaft.

Therefore, a needle roller bearing having needle rollers whose own axes are extended in the axial direction of the input shaft is typically adaptable as the roller bearing of the HST. In this regard, the above-mentioned words "axial" with regard to the rollers, which are based on the axial direction of the input shaft, are also based on the extension direction of the roller's own axis. For example, the above-mentioned axial middle portion of the roller coincides to a middle portion of the roller in the extension direction of the roller's own axis, i.e., in the axial direction of the roller. The above-mentioned eccentricity of the rollers in the axial direction of the input shaft is synonymous with the eccentricity of the rollers in the axial direction of the rollers coinciding to the axial direction of the input shaft. Therefore, for example, the above-mentioned effect of rapid "axial" spreading of lubricating fluid has the same meaning of an effect of rapid spreading of lubricating fluid in the axial direction of the rollers.

These, other and further objects, features and advantages of the invention will appear more fully in the following detailed description with reference to the attached drawings.

BRIEF DESCRIPTION OF THE DRAWINGS

FIG. 7(a) is a fragmentary sectional side view of input shaft 2 provided with needle roller bearing 28 and a third lubricating fluid passage 70B for supplying lubricating fluid to needle roller bearing 28, and FIG. 7(b) is a cross sectional view taken along C-C line of FIG. 7(a).

DETAILED DESCRIPTION OF THE INVENTION

Figure 1:
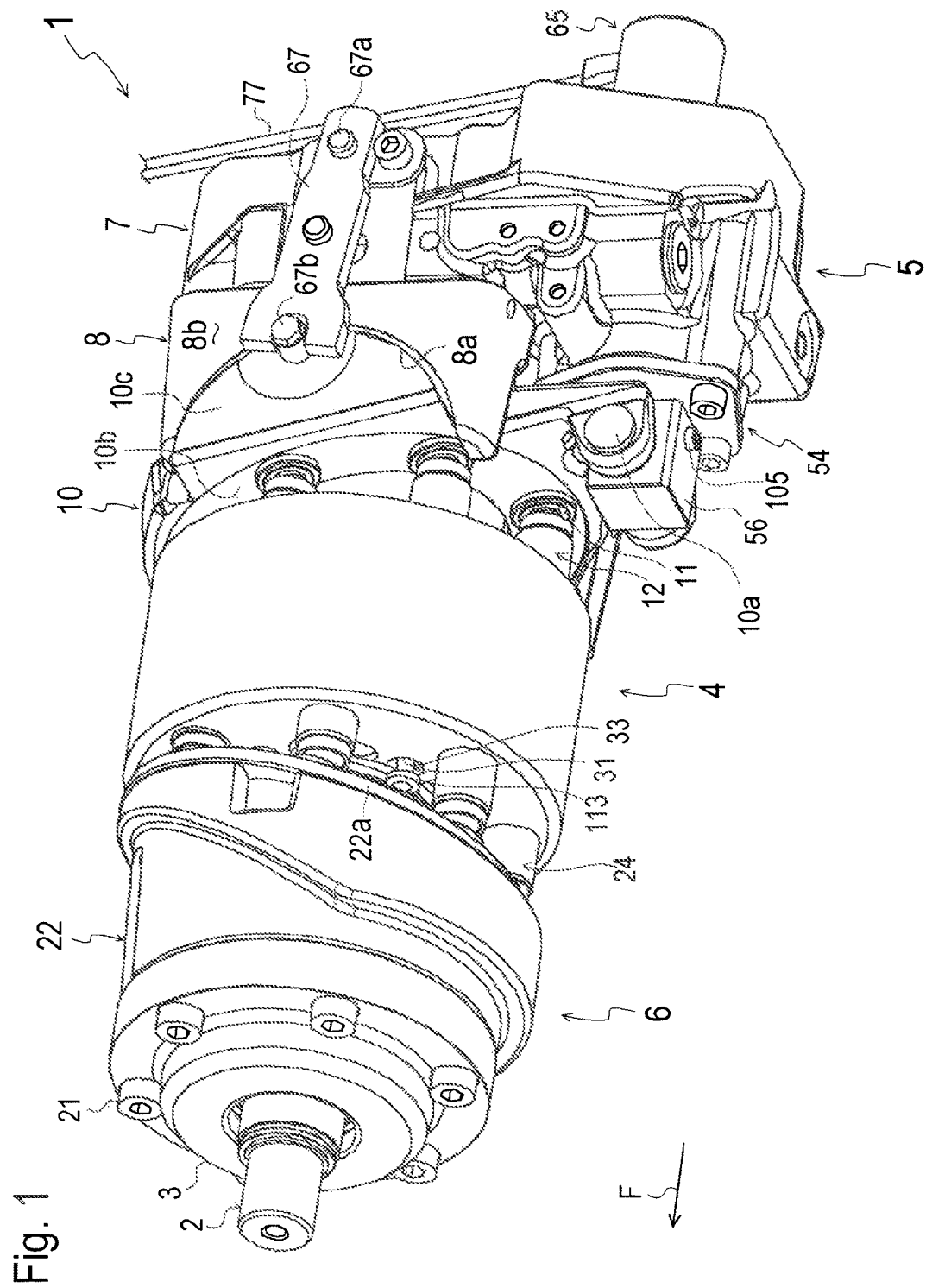
FIG. 1 is a perspective view of an HST 1.

Embodiments of an HST 1 according to the invention will be described on an assumption that HST 1 is directed forward as designated by an arrow F shown in FIG. 1 and other drawings and a later-discussed pump control actuator 54 is disposed below a later-discussed input shaft 2. Alternatively, various arrangements of HST 1 are conceivable. For example, HST 1 may be arranged to have pump control actuator 54 above input shaft 2.

Referring to FIGS. 1 to 4, HST 1 will be described. HST 1 has an input shaft 2 having a fore-and-aft horizontal axis, an output rotary member 3 provided around input shaft 2 and rotatably relative to input shaft 2, and a plunger block 4 fixed on input shaft 2. A pump assembly 5 is provided around input shaft 2 and rearward from plunger block 4 so as to serve as a hydraulic pump of HST 1. A motor assembly 6 including output rotary member 3 is provided around input shaft 2 and forward from plunger block 4 so as to serve as a hydraulic motor of HST 1. A front end of input shaft 2 projects forward from motor assembly 6 so as to be adapted to be drivingly connected to a prime mover such as an engine (not shown). Output rotary member 3 is adapted to be drivingly connected to another output member such as a gear (not shown).

As a directional definition of HST 1, axial and radial directions of any component or portion in HST 1 are defined as synonymous with axial and radial directions of input shaft 2 unless otherwise specifically noted. This directional definition of HST 1 is natural because the hydraulic pump and motor of HST 1 constituted by plunger block 4 and pump and motor assemblies 5 and 6 are axial plunger type pump and motor including later-discussed pump and motor plungers 12 and 24 whose axes are oriented in the axial direction of input shaft 2. Therefore, hereinafter, any expression using a word "axial" (or "axially") or "radial" (or "radially") is based on the axial and radial directions of input shaft 2 unless otherwise specifically noted.

Plunger block 4 is formed therein with rearwardly open pump cylinder bores 13 and forwardly open motor cylinder bores 25 so that pump cylinder bores 13 and motor cylinder bores 25 are alternately aligned around input shaft 2 when viewed in the axial direction of input shaft 2. Pump plungers 12 are fitted in respective pump cylinder bores 13 via respective springs 14 so as to be reciprocally slidable in the axial direction of input shaft 2 and so as to be biased rearward by springs 14. Heads of pump plungers 12 project rearward from plunger block 4. Motor plungers 24 are fitted in respective motor cylinder bores 25 via respective springs 26 so as to be reciprocally slidable in the axial direction of input shaft 2 and so as to be biased forward by springs 26. Heads of motor plungers 24 project forward from plunger block 4.

Plunger block 4 is further formed therein with pump valve bores 32 and motor valve bores 33 so that pump valve bores 32 and motor valve bores 33 are alternately aligned around input shaft 2 when viewed in the axial direction of input shaft 2. Pump spool valves 20 are fitted in respective pump valve bores 32 so as to be reciprocally slidable in the axial direction of input shaft 2. Pump spool valves 20 are formed with respective rods 110 axially extended to project rearward from plunger block 4, and rear ends of rods 110 of respective pump spool valves 20 are formed as flanged heads 111. Motor spool valves 31 are fitted in respective motor valve bores 33 so as to be reciprocally slidable in the axial direction of input shaft 2. Motor spool valves 31 are formed with respective rods 112 axially extended to project forward from plunger block 4, and front ends of rods 112 of respective motor spool valves 31 are formed as flanged heads 113.

A rear main fluid passage 41 and a front main fluid passage 42 are formed in plunger block 4. Each of pump and motor valve bores 32 and 33 is joined to both main fluid passages 41 and 42. Main fluid passages 41 and 42 can be supplied with hydraulic fluid by a later-discussed charge system provided in input shaft 2.

Pump assembly 5 includes a base block 7, a swash plate holder 8, bearings 9, a pump swash plate 10 and shoes 11. Base block 7 is adapted to be fixed to a frame of a vehicle (not shown), a transaxle casing (not shown) or the like. Base block 7 is fitted to a rear portion of input shaft 2 via a tapered roller bearing 18 so as to allow input shaft 2 to rotate relative to base block 7. Base block 7 has a vertical front surface 7d and is formed with an axial boss portion 7b extended forward from vertical front surface 7d and along input shaft 2. Swash plate holder 8 is fitted on axial boss portion 7b of base block 7, is fitted at a vertical rear end surface thereof to vertical front surface 7d of base block 7, and is fixed to base block 7 via bolts or the like (not shown).

Swash plate holder 8 is formed with forwardly projecting right and left support portions 8b, and a ring-shaped main portion of pump swash plate 10 is disposed between right and left support portions 8b of swash plate holder 8. Right and left support portions 8b of swash plate holder 8 are formed with respective recesses 8a that are semicircular in side view and are open forward. Right and left recesses 8a are provided with respective bearings 9 such as metal bearings that are fitted to the semicircularly curved surfaces of recesses 8a. Pump swash plate 10 is formed with right and left trunnions 10c rightward and leftward from the ring-shaped main portion thereof. Right and left trunnions 10c (only right trunnion 10c is shown in FIGS. 1 and 2) are semicircular in side view and are slidably fitted into respective recesses 8a via respective bearings 9. In this way, swash plate holder 8 pivotally supports pump swash plate 10 so that pump swash plate 10 is tiltable due to the sliding of trunnions 10c along recesses 8a via bearings 9. Therefore, pump swash plate 10 serves as a movable swash plate constituting a variable displacement hydraulic pump of HST 1.

Figure 2:
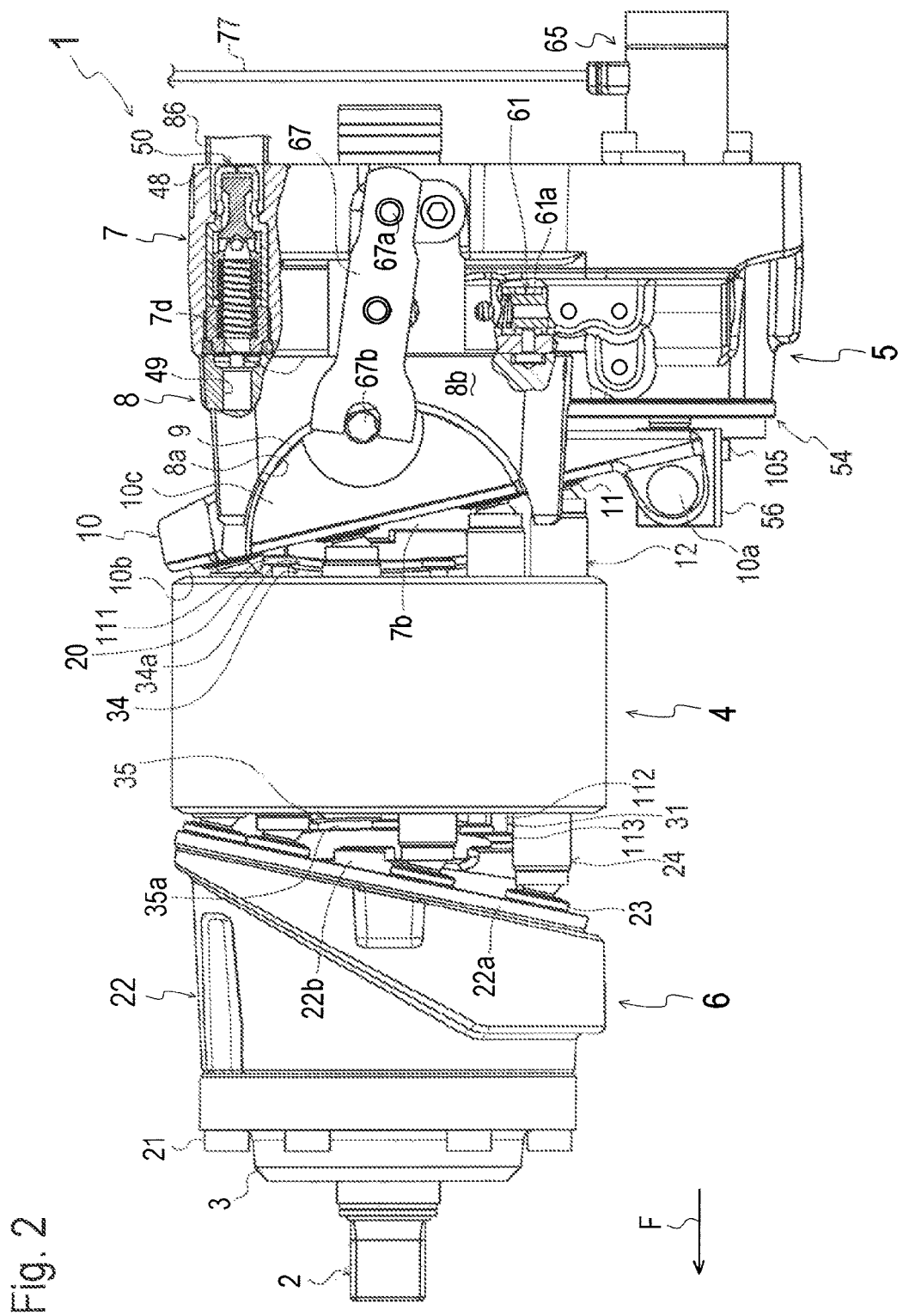
FIG. 2 is a side view of HST 1.

Right and left arms 67 (only right arm 67 is shown in FIGS. 1 and 2) are interposed between respective right and left side surfaces of base block 7 and respective right and left trunnions 10c of pump swash plate 10. Rear end portions of arms 67 are pivotally supported on the respective right and left side surfaces of base block 7 via respective bolts (or nuts) 67a that define a pivot on which arms 67 are rotatably centered. Front end portions of arms 67 are fork-shaped so as to nip respective bolts (or nuts) 67b fixed on respective right and left trunnions 10c so that right and left arms 67 are articulately joined to respective right and left trunnions 10c via respective bolts 67b. Therefore, when pump swash plate 10 is tilted by a later-discussed motor control actuator 54, arms 67 rotate with respect to the pivot defined by bolts 67a so as to rotate trunnions 10c joined to arms 67 via the articular joint defined by bolts 67b, thereby guiding trunnions 10c to slide along recesses 8a via bearings 9.

Axial boss portion 7b of base block 7 is passed through the ring-shaped main portion of pump swash plate 10 so that pump swash plate 10 is tiltably free from axial boss portion 7b, i.e., base block 7 and input shaft 2. A thrust plate 10b is fitted on a front surface of the ring-shaped main portion of pump swash plate 10. Shoes 11 are fitted to the heads of respective pump plungers 12 projecting rearward from plunger block 4 and slidably abut against thrust plate 10b. Therefore, pump plungers 12 are pressed against thrust plate 10b of pump swash plate 10 by respective springs 14.

On the above-mentioned assumption that pump control actuator 54 is disposed below input shaft 2, a lower portion of pump swash plate 10 is extended downward so as to be formed as a cradle 10a having a pivot pin, and pump control actuator 54 for controlling the tilt direction and angle of pump swash plate 10 is provided in a lower portion of base block 7 so as to be operatively connected to cradle 10a of pump swash plate 10. Pump control actuator 54 includes a forwardly open cylinder recess 7a formed in the lower portion of base block 7, a push-pull member 55 joined at a front end thereof to cradle 10a and disposed at a rear end thereof in cylinder recess 7a, and a cap 104 covering the front opening of cylinder recess 7a. The rear end of push-pull member 55 is formed as a piston 55a that is fitted in cylinder recess 7a slidably forward and rearward in the axial direction of input shaft 2. The slide of piston 55a of push-pull member 55 is controlled by a later-discussed hydraulic control system.

Cap 104 is fitted on vertical front surface 7d of the lower portion of base block 7 so as to cover the front opening of cylinder recess 7a. Push-pull member 55 is formed with a piston rod 55b extended forward from piston 55a through cap 104. A bracket 56 having a U-shaped groove is fixed via a pin 105 on a front end of piston rod 55b projecting forward from cap 104, and the pivot pin projecting from cradle 10a of pump swash plate 10 is fitted into the U-shaped groove of bracket 56, so that pump swash plate 10 is pivotally connected at cradle 10a to push-pull member 55.

Piston 55a of push-pull member 55 divides cylinder recess 7a into a front fluid chamber 57 between cap 104 and piston 55a and a rear fluid chamber 58 between piston 55a and a rear end surface of cylinder recess 7a. Therefore, when the hydraulic fluid supply to cylinder recess 7a is controlled to reduce the volume of front fluid chamber 57 and to increase the volume of rear fluid chamber 58, push-pull member 55 moves forward so as to push cradle 10a forward, so that pump swash plate 10 is tilted with trunnions 10c downwardly sliding along recesses 8a so as to have its lower portion as a forwardly projecting portion and so as to have its upper portion as a rearwardly withdrawn portion. On the contrary, when the hydraulic fluid supply to cylinder recess 7a is controlled to increase the volume of front fluid chamber 57 and to reduce the volume of rear fluid chamber 58, push-pull member 55 moves rearward so as to pull cradle 10a rearward, so that pump swash plate 10 is tilted with trunnions 10c upwardly sliding along recesses 8a so as to have its upper portion as the forwardly projecting portion and so as to have its lower portion as the rearwardly withdrawn portion.

When the tilt angle of pump swash plate 10 is zeroed, i.e., when thrust plate 10b is vertical, motor assembly 6 rotates at the same speed with plunger block 4. The rotational position of pomp swash plate 10. When its tilt angle is zero is defined as a middle speed position of pump swash plate 10. When pump swash plate 10 is tilted in one direction from the middle speed position, motor assembly 6 rotates faster than plunger block 4. When pump swash plate 10 is tilted in another direction from the middle speed position, motor assembly 6 rotates slower than plunger block 4.

A pump valve cam ring 34 is disposed around input shaft 2 between a rear end surface of plunger block 4 and a front end of axial boss portion 7b of base block 7 passed through pump swash plate 10, and is fixed to axial boss portion 7b of base block 7. A zigzagged cam groove 34a is formed annularly on pump valve cam ring 34, and flanged heads 111 of pump spool valves 20 are fitted into cam groove 34a, so that the position of flanged head 111 fitted in cam groove 34a in the axial direction of input shaft 2 is defined as an axial position of each pump spool valve 20. Therefore, during the rotation of plunger block 4 together with input shaft 2, the axial position of each pump spool valve 20 defined by cam groove 34a is changed so as to control flow of fluid in hydraulically pressurized or depressed corresponding pump valve bore 32 between rear main fluid passage 41 and front main fluid passage 42.

Motor assembly 6 includes output rotary member 3, a motor swash plate 22 and shoes 23. Cylindrical motor swash plate 22 is fitted on input shaft 2 rotatably relative to input shaft 2. A vertical front surface of motor swash plate 22 abuts against a vertical rear surface of output rotary member 3, and bolts 21 are screwed into motor swash plate 22 via output rotary member 3 so as to fasten output rotary member 3 to motor swash plate 22.

Motor swash plate 22 has a slanted ring-shaped rear surface so as to serve as a fixed swash plate constituting a fixed variable displacement hydraulic motor of HST 1. In this regard, motor swash plate 22 is defined as a "fixed" swash plate because the slant angle of the rear surface of motor swash plate 22 is fixed regardless of rotation of motor assembly 6. A thrust plate 22a is fitted on the slanted ring-shaped rear surface of motor swash plate 22. Shoes 23 are fitted to the heads of respective motor plungers 24 projecting forward from plunger block 4, and slidably abut against thrust plate 22a. Therefore, motor plungers 24 are pressed against thrust plate 22a of motor swash plate 22 by respective springs 26.

Motor swash plate 22 is formed with an axial boss portion 22b that is extended rearward from the slanted ring-shaped rear surface having thrust plate 22a thereon so as to have a vertical rear end surface. A motor valve earn ring 35 is disposed around input shaft 2 between a front end surface of plunger block 4 and the rear end of axial boss portion 22b of motor swash plate 22, and is fixed to axial boss portion 22b of motor swash plate 22. A zigzagged cam groove 35a is formed annularly on motor valve cam ring 35, and flanged heads 113 of motor spool valves 31 are fitted into cam groove 35a, so that the position of flanged head 113 fitted in cam groove 35a in the axial direction of input shaft 2 is defined as the axial position of each motor spool valve 31. Therefore, during the rotation of plunger block 4 together with input shaft 2, the axial position of each motor spool valve 31 defined by cam groove 35a is changed so as to control flow of fluid in hydraulically pressurized or depressed corresponding motor valve bore 33 between rear main fluid passage 41 and front main fluid passage 42.

Figure 3:
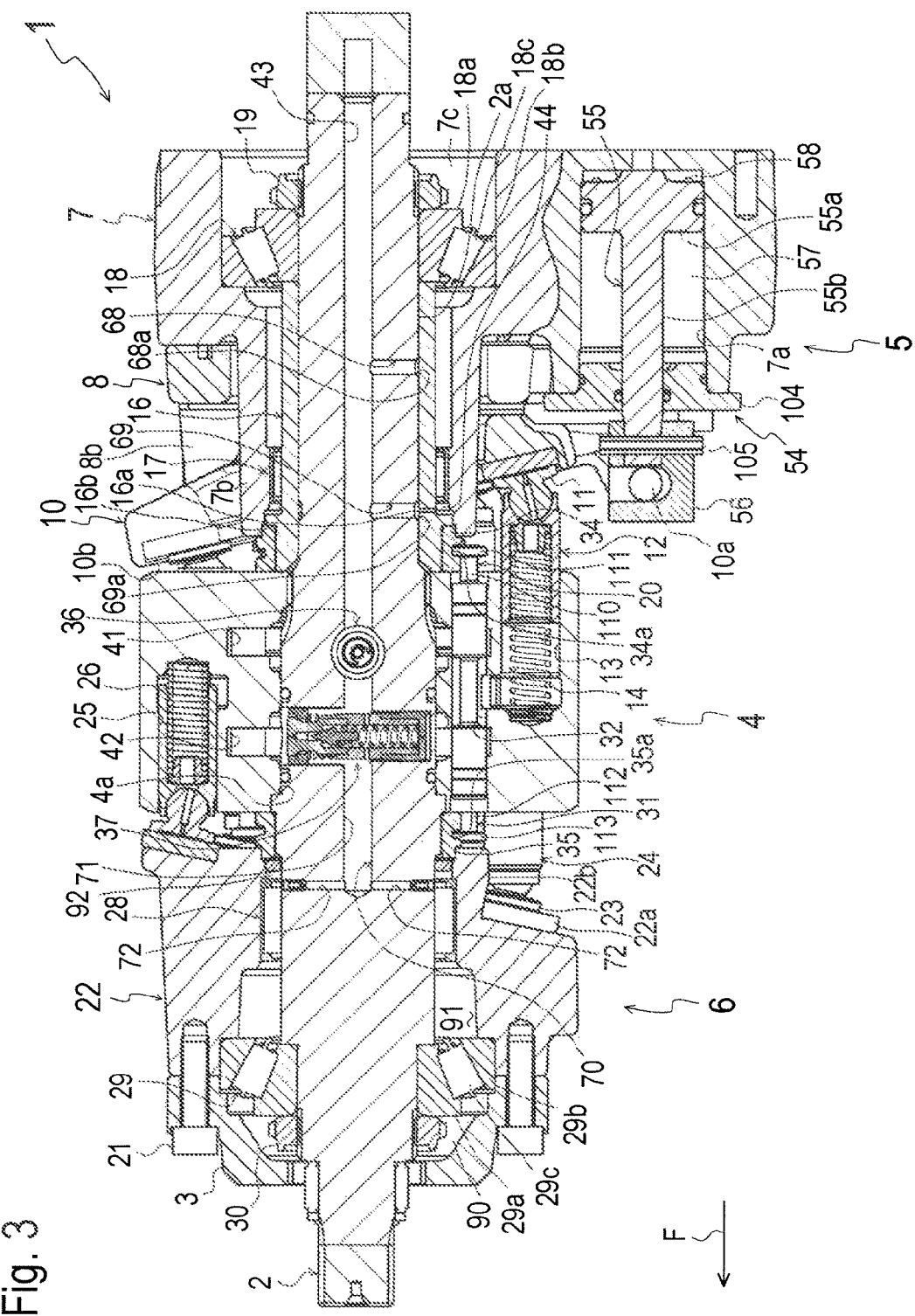
FIG. 3 is a sectional side view of HST 1 provided with a first lubricating fluid passage 70 for supplying lubricating fluid to a needle roller bearing 28 between an input shaft 2 and a motor swash plate 22.

Referring to FIG. 3, a configuration of HST 1 to journal input shaft 2 in pump assembly 5 will be described. Tapered roller bearing 18 is disposed in a bearing chamber 7c that is a rearwardly open recess formed in base block 7. Tapered roller bearing 18 includes an inner ring 18a, an outer ring 18b and tapered rollers 18c between inner and outer rings 18a and 18b. Timer ring 18a is fitted at the inner peripheral surface thereof to an outer peripheral surface 2a of input shaft 2, and outer ring 18b is fitted at the outer peripheral portion thereof to base block 7. A nut 19 is screwed on input shaft 2 in bearing chamber 7c so as to hinder inner ring 18a of tapered roller bearing 18 from moving rearward along input shaft 2.

A sleeve 16 is fitted on outer peripheral surface 2a of input shaft 2 between a front end surface of inner ring 18a of tapered roller bearing 18 and the vertical rear end surface of plunger block 4. Base block 7 has an inner peripheral surface around an outer peripheral surface of sleeve 16 between a front end of bearing chamber 7c and the front end of axial boss portion 7b. The inner peripheral surface of base block 7 is spaced from the outer peripheral surface of sleeve 16. Sleeve 16 is formed with a flange 16b covering a front end opening of the peripheral gap space between the inner peripheral surface of base block 7 and the outer peripheral surface of sleeve 16. Pump valve cam ring 34 fixed to the front end of axial boss portion 7b of base block 7 is fitted on a front end portion of sleeve 16 extended forward from flange 16b of sleeve 16 to the rear end surface of plunger block 4 so as to allow rotation of sleeve 16 relative to pump valve cam ring 34. In this regard, a needle roller bearing 17 is disposed rearward from flange 16b of sleeve 16 so as to be interposed between the inner peripheral surface of base block 7 and the outer peripheral surface of sleeve 16.

Referring to FIG. 3, a configuration of HST 1 to journal input shaft 2 in motor assembly 6 will be described. Motor swash plate 22 and output rotary member 3 define a bearing chamber 90 therein, and a tapered roller bearing 29 is disposed in bearing chamber 90. Tapered roller bearing 29 includes an inner ring 29a, an outer ring 29b and tapered rollers 29c between inner and outer rings 29a and 29b. Inner ring 29a is fitted at the inner peripheral portion thereof to outer peripheral surface 2a of input shaft 2, and outer ring 29b is fitted at the outer peripheral portion thereof to output rotary member 3 and motor swash plate 22, so that tapered roller bearing 29 allows the rotation of input shaft 2 relative to motor assembly 6, i.e., output rotary member 3 and motor swash plate 22. A nut 30 is screwed on input shaft 2 in bearing chamber 90 so as to hinder inner ring 29a of tapered roller bearing 29 from moving forward along input shaft 2.

Figure 4:
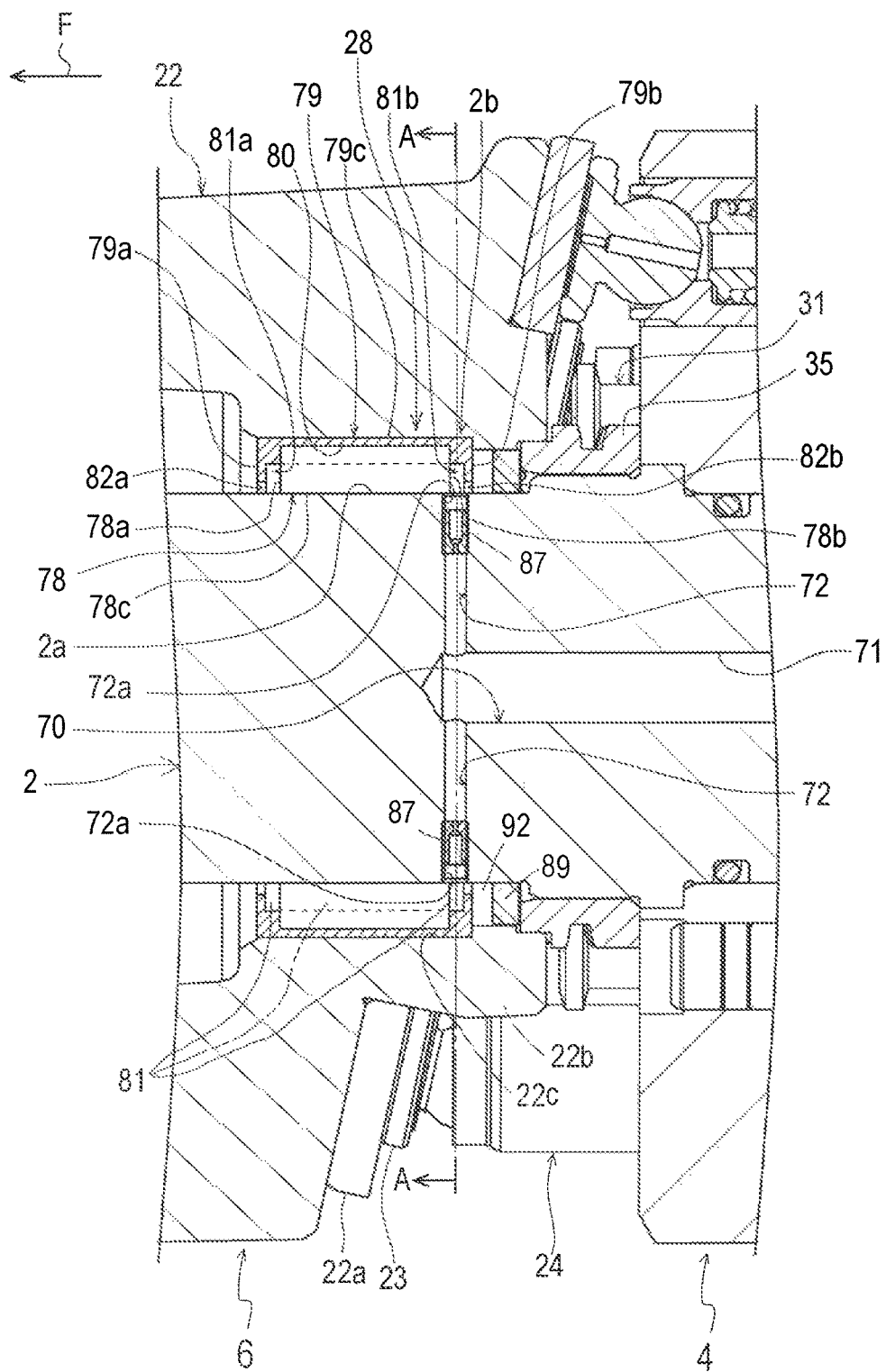
FIG. 4 is a fragmentary sectional side view of HST 1 showing first lubricating fluid passage 70.

Referring to FIGS. 3 and 4, motor swash plate 22 has an inner peripheral surface 22c around outer peripheral surface 2a of input shaft 2 between a rear end of bearing chamber 90 and the rear end of axial boss portion 22b. Inner peripheral surface 22c of motor swash plate 22 is spaced from outer peripheral surface 2a of input shaft 2. Motor valve cam ring 35 fixed to the rear end of axial boss portion 22b of motor swash plate 22 is fitted on outer peripheral surface 2a of input shaft 2 extended rearward from the rear end of axial boss portion 22b of motor swash plate 22 to the front end surface of plunger block 4 so as to cover a rear end opening of the peripheral gap space between inner peripheral surface 22c of motor swash plate 22 and outer peripheral surface 2a of input shaft 2 and so as to allow the rotation of input shaft 2 relative to motor valve cam ring 35. In this regard, a needle roller bearing 28 is interposed between inner peripheral surface 22c of motor swash plate 22 and outer peripheral surface 2a of input shaft 2 forward from motor valve can ring 35.

Referring to FIGS. 2, 3, 4, 5(a) and 5(b), a hydraulic circuit system in HST 1 to charge hydraulic fluid to main fluid passages 41 and 42 in plunger block 4, to control motor control actuator 54, and to supply lubricating fluid to bearings and the like between input shaft 2 and pump and motor assemblies 5 and 6 will be described. As shown in FIG. 3, input shaft 2 is formed therein with an axial fluid passage 43. As shown in FIG. 2, a pressure regulation valve 50 is provided in base block 7 so as to regulate a pressure of fluid delivered from an external charge pump (not shown). Pressure regulation valve 50 delivers the pressure-regulated fluid to a fluid passage 48 formed in base block 7. Fluid passage 48 is open at a rear end surface of base block 7, and an external pipe 86 is extended from the opening of fluid passage 48 at the rear end surface of base block 7 so as to deliver the pressure-regulated fluid to axial fluid passage 43 in input shaft 2. Illustration of a structure of supplying fluid from pipe 86 to axial fluid passage 43 is omitted. Surplus fluid drained from pressure regulation valve 50 is discharged to a fluid passage 49 formed in swash plate holder 8 so as to be supplied to a fluid sump formed in swash plate holder 8 or the like.

As shown in FIG. 3, rear and front main fluid passages 41 and 42 formed in plunger block 4 are open to outer peripheral surface 2a of input shaft 2. Input shaft 2 is provided therein with rear and front charge relief valves 36 and 37 each of which includes a charge check valve and a relief valve. Rear and front charge relief valves 36 and 37 cross axial fluid passage 43 and extend diametrically in input shaft 2 and perpendicularly to each other when viewed in the axial direction of input shaft 2. Rear charge relief valve 36 is configured so as to supply fluid via its charge check valve from axial fluid passage 43 to rear main fluid passage 41 when being hydraulically depressed and so as to release fluid via its relief valve from rear main fluid passage 41 when being excessively hydraulically pressurized to axial fluid passage 43. Front charge relief valve 37 is configured so as to supply fluid via its charge check valve from axial fluid passage 43 to front main fluid passage 42 when being hydraulically depressed and so as to release fluid via its relief valve from front main fluid passage 42 when being excessively hydraulically pressurized to axial fluid passage 43.

As shown in FIG. 2, a hydraulic servo valve 61 having a spool 61a is provided in base block 7 so as to control the fluid supply to fluid chambers 57 and 58 of cylinder recess 7a, and an electromagnetic proportional valve 65 is mounted on base block 7 so as to control spool 61a of hydraulic servo valve 61. Electromagnetic proportional valve 65 extends outward from base block 7 so as to be electrically connected to a controller (not shown) via an electric wire 77. A speed control manipulator such as a pedal or a lever is provided on a vehicle or the like equipped with HST 1, and the controller commands electromagnetic proportional valve 65 via electric wire 77 in response to detection of an optionally selected operational position of the speed control manipulator.

HST 1 is provided with a servo pump (not shown) and with a fluid passage (not shown) formed in base block 7 to supply fluid delivered from the servo pump to hydraulic servo valve 61. Spool 61a of hydraulic servo valve 61 is controlled by electromagnetic proportional valve 65 electrically controlled by the controller so that hydraulic servo valve 61 supplies the fluid delivered from the servo pump to one of fluid chambers 57 and 58 and simultaneously sucks fluid from the other of fluid chambers 57 and 58, thereby causing a differential pressure between fluid chambers 57 and 58. Piston 55a moves forward or rearward according to this differential pressure so that push-pull member 55 moves forward to push cradle 10a of pump swash plate 10 forward or moves rearward to pull cradle 10a rearward, thereby tilting pump swash plate 10.

As shown in FIG. 3, rear and front radial fluid passages 68 and 69 are formed in input shaft 2 so as to extend radially from axial fluid passage 43 and so as to have respective open ends serving as lubricating fluid spill ports 68a and 69a at outer peripheral surface 2a of input shaft 2, so that fluid spilled out from rear end front lubricating fluid spill ports 68a and 69a flows along outer peripheral surface 2a so as to lubricate the inner peripheral surface of sleeve 16 contacting outer peripheral surface 2a of input shaft 2 and so as to lubricate the inner peripheral surface of inner ring 18a of tapered roller bearing 18 contacting the rear end of sleeve 16 and outer peripheral surface 2a of input shaft 2.

A peripheral gap space between the outer peripheral surface of sleeve 16 and the inner peripheral surface of axial boss portion 7b of base block 7 and between flange 16b of sleeve 16 and needle roller bearing 17 is defined as an outside gap space 44 of needle roller bearing 17 disposed in the outside of needle roller hearing 17. An orifice 16a is radially formed in sleeve 16 so as to fluidly connect lubricating fluid spill port 69a to outside gap space 44. Therefore, the fluid spilled out from lubricating fluid spill port 69a is partly introduced to outside gap space 44 via orifice 16a, and the fluid in outside gap space 44 floods needle roller bearing 17 disposed rearward from outside gap space 44 so as to lubricate needle roller bearing 17, and the fluid further flows rearward to outer ring 18b and tapered rollers 18c of tapered roller bearing 18 so as to lubricate tapered roller bearing 18.

As mentioned above, radial fluid passage 69 in input shaft 2 and radial orifice 16a in sleeve 16 are not directly joined to the inside of needle roller bearing 17 however are merely joined to outside gap space 44 in the outside of needle roller bearing 17 so as to lubricate needle roller bearing 17 interposed between sleeve 16 and axial boss portion 7b of base block 7 because base block 7 is fixed to a vehicle body frame or the like and sleeve 16 follows input shaft 2 rotating at a constant speed as far as the output rotary speed of the prime mover drivingly connected to input shaft 2 is constant. In other words, the fluid supply from radial fluid passage 69 and orifice 16a via outside gap space 44 is enough to lubricate needle roller bearing 17 because needle roller bearing 17 in pump assembly 5 is not subjected to sudden change of torque or rotary speed.

In comparison with needle roller bearing 17 in pump assembly 5, needle roller bearing 28 that is provided in motor assembly 6 so as to be interposed between input shaft 2 and motor swash plate 22 is liable to have sudden change of torque or rotary speed causing lack of lubricating fluid because an operator optionally manipulates the above-mentioned speed control manipulator for operating pump control actuator 54 to change the tilt angle and direction of pump swash plate 10 so as to change the rotary speed of motor swash plate 22 and output rotary member 3 and so as to cause a sudden change of differential rotary speed or torque between input shaft 2 and motor swash plate 22.

Therefore, as shown in FIGS. 3, 4, 5(a) and 5(b), a lubricating fluid passage 70 is formed in input shaft 2 in consideration of arrangement of needle roller bearing 28, thereby sufficiently supplying lubricating fluid to needle roller bearing 28 regardless of the sudden change of differential rotary speed or torque between input shaft 2 and motor swash plate 22. Lubricating fluid passage 70 includes an axial fluid passage 71 and a pair of radial fluid passages 72. Axial fluid passage 43 further extends forward from front charge relief valve 37 crossing axial fluid passage 43 so that the front portion of axial fluid passage 43 extending forward from front charge relief valve 37 serves as axial fluid passage 71. Radial fluid passages 72 are extended from a front end of axial fluid passage 71 to outer peripheral surface 2a of input shaft 2 in the radial opposite directions. Port members 87 are fitted in respective radial fluid passages 72 so as to provide respective radial fluid passages 72 with lubricating fluid spill ports 72a open at outer peripheral surface 2a of input shaft 2.

Needle roller bearing 28 includes needle rollers 78 and a roller retaining ring 79 holding needle rollers 78 in the inside thereof. Roller retaining ring 79 is formed to include a vertical front end side portion 79a, a vertical rear end side portion 79b and a peripheral portion 79c. Peripheral portion 79c is extended between front and rear end side portions 79a and 79h. In other words, front and rear end side portions 79a and 79b are extended vertically (i.e., in the radial direction of input shaft 2) from front and rear ends of peripheral portion 79c of roller retaining ring 79 toward outer peripheral surface 2a of input shaft 2.

Vertical front and rear end side portions 79a and 79b of roller retaining ring 79 are defined as front and rear axial ends of needle roller bearing 28. A peripheral gap space between bearing chamber 90 and the front axial end of needle roller bearing 28 (i.e., front end side portion 79a of roller retaining ring 79) and between outer peripheral surface 2a of input shaft 2 and inner peripheral surface 22c of motor swash plate 22 is defined as a front outside gap space 91 of needle roller bearing 28 disposed in the forward outside of roller retaining ring 79. A peripheral gap space between the rear axial end of needle roller bearing 28 (i.e., rear end side portion 79b of roller retaining ring 79) and a washer 89 adjoining a front end of motor valve cam ring 35 and between outer peripheral surface 2a of input shaft 2 and inner peripheral surface 22c of motor swash plate 22 is defined as a rear outside gap space 92 of needle roller hearing 28 disposed in the rearward outside of roller retaining ring 79.

Peripheral portion 79c has an inner peripheral surface spaced from outer peripheral surface 2a of input shaft 2, and peripheral portion 79c is formed with half-pipe shaped recesses 80 open at the inner peripheral surface thereof. Needle rollers 78 have respective half portions outward in the radial direction of input shaft 2, and these half portions of needle rollers 78 are rollably fitted into respective recesses 80. An outer peripheral surface of peripheral portion 79c contacts inner peripheral surface 22c of motor swash plate 22, and portions of needle rollers 78 projecting from respective recesses 80 (i.e., the other half portions of needle rollers 78 inward in the radial direction of input shaft 2) contact outer peripheral surface 2a of input shaft 2, whereby needle roller bearing 28 is interposed between input shaft 2 and motor swash plate 22. In other words, needle roller bearing 28 is disposed on outer peripheral surface 2a of input shaft 2 so as to support motor swash plate 22. Surfaces of needle rollers 78 rollably contacting outer peripheral surfaces 2a of input shaft 2 are defined as rollable contact surfaces 78c of needle rollers 78. In this way, columnar needle rollers 78 are rollably interposed between input shaft 2 and roller retaining ring 79 so as to have their own axes parallel to the fore-and-aft axis of input shaft 2. Therefore, the axial direction of needle roller 78 referred to in the following description is synonymous with the axial direction of input shaft 2.

Needle roller bearing 28 has an inside gap space 81 in the inside of roller retaining ring 79 along outer peripheral surface 2a of input shaft 2 so that inside gap space 81 is defined by front and rear end side portions 79a and 79b and peripheral portion 79c so as to accommodate needle rollers 78. In other words, needle roller bearing 28 serves as a lubricated object of HST 1 to be lubricated by lubricating fluid spilled from lubricating fluid spill ports 72a of lubricating fluid passage 70. Front and rear end side portions 79a and 79b of roller retaining ring 79 define opposite axial end portions of the lubricated object. Inside gap space 81 and rollers 78 disposed in inside gap space 81 define an inside section of the lubricated object between the axial end portions of the lubricated object.

Further, roller retaining ring 79 is formed so as to have front ends of recesses 80 offset rearward from a rear end surface of front end side portion 79a and so as to have rear ends of recesses 80 offset forward from a front end surface of rear end side portion 79b. Therefore, inside gap space 81 of needle roller bearing 28 includes a front end inside gap space 81a and a rear end inside gap space 81b. Front end inside gap space 81a is defined by the rear end surface of front end side portion 79a, the inner peripheral surface of peripheral portion 79c, front end surfaces 78a of needle rollers 78 and outer peripheral surface 2a of input shaft 2. Rear end inside gap space 81b is defined by the front end surface of rear end side portion 79b, the inner peripheral surface of peripheral portion 79c, rear end surfaces 78b of needle rollers 78 and outer peripheral surface 2a of input shaft 2.

Front end inside gap space 81a between front end side portion 79a of roller retaining ring 79 and front end surfaces 78a of needle rollers 78 is defined as a front end cavity of inside gap space 81 along outer peripheral surface 2a of input shaft 2, and rear end inside gap space 81b between rear end side portion 79b of roller retaining ring 79 and rear end surfaces 78b of needle rollers 78 is defined as a rear end cavity of inside gap space 81 along outer peripheral surface 2a of input shaft 2. In addition, the portion of inside gap space 81 accommodating needle rollers 78 between front and rear end inside gap spaces 81a and 81b has cavities aligned along outer peripheral surface 2a of input shaft 2 so that each of these cavities is provided between every pair of neighboring needle rollers 78 projecting from recesses 80. Further, each needle roller 78 is crowned at front and rear edges thereof so that inside gap space 81 has a small cavity between each crowned surface of each needle roller 78 and outer peripheral surface 2a of input shaft 2. The abovementioned cavities of inside gap space 81 are used to receive lubricating fluid supplied by lubricating fluid passage 70.

A narrow peripheral gap space 82a is provided between an inner peripheral edge of front end side portion 79a of roller retaining ring 79 and outer peripheral surface 2a of input shaft 2 so as to serve as a cavity to receive lubricating fluid flowing between front outside gap space 91 and front end inside gap space 81a. A narrow peripheral gap space 82b is provided between an inner peripheral edge of rear end side portion 79b of roller retaining ring 79 and outer peripheral surface 2a of input shaft 2 so as to serve as a cavity to receive lubricating fluid flowing between rear outside gap space 92 and rear end inside gap space 81b.

In this embodiment shown in FIGS. 3, 4, 5(a) and 5(b), lubricating fluid passage 70 including axial fluid passage 71 and the pair of radial fluid passages 72 is formed so that both lubricating fluid spill ports 72a mainly face rear end inside gap space 81b and slightly face rear (crowned) end portions of rollable contact surfaces 78c of needle rollers 78 in the portion of inside gap space 81 forward from rear end inside gap space 81b. This position of lubricating fluid spill ports 72a on outer peripheral surface 2a of input shaft 2 in the axial direction of input shaft 2 is defined as a first axial position 2b. In other words, first axial position 2b of lubricating fluid spill ports 72a defines the inside section of the lubricated object adjacent to one of the opposite axial end portions of the lubricated object.

A lubricating fluid supply to needle roller bearing 28 by lubricating fluid passage 70 having lubricating fluid spill ports 72a at first axial position 2b will be described with reference to FIGS. 4, 5(a) and 5(b). Fluid flowing in axial fluid passage 71 (as the front portion of axial fluid passage 43) is substantially free from the centrifugal force of rotating input shaft 2 until it reaches the front end of axial fluid passage 71. After fluid reaches the front end of axial fluid passage 71, the fluid flows from the front end of axial fluid passage 71 into radial fluid passages 72 in the radial opposite directions. The fluid flowing into radial fluid passages 72 is defined as lubricating fluid 85. Lubricating fluid 85 flowing in radial fluid passages 72 toward respective lubricating fluid spill ports 72a is accelerated by the centrifugal force of rotating input shaft 2 so that lubricating fluid 85 is vigorously spilled out from lubricating fluid spill ports 72a into rear end inside gap space 81b.

Figure 5:
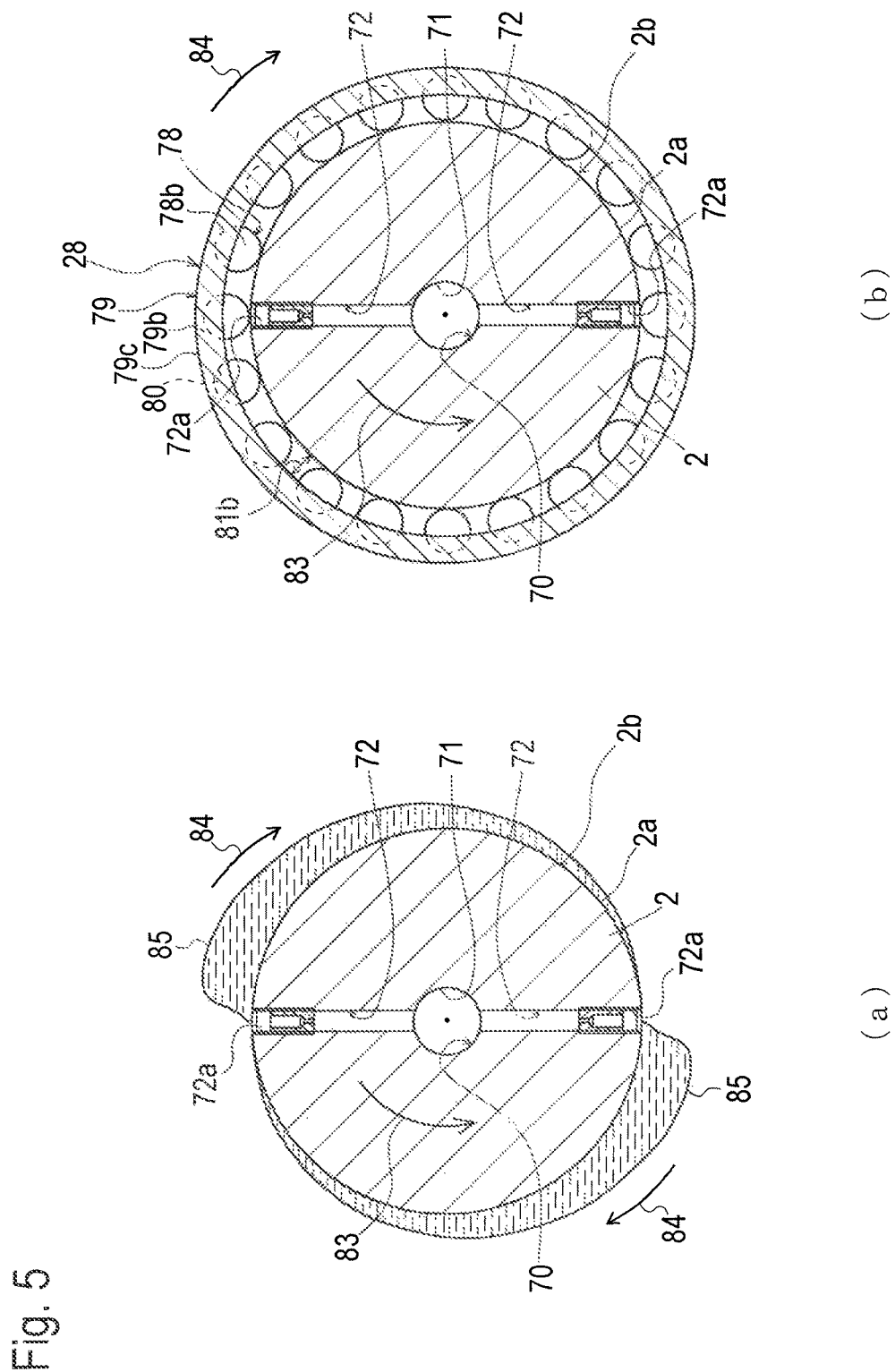
FIG. 5(a) is a cross sectional view taken along A-A line of FIG. 4 except for showing flow of lubricating fluid delivered from lubricating fluid spill ports 72a on an assumption that needle roller bearing 28 has been removed from input shaft 2.
FIG. 5(b) is a cross sectional view taken along A-A line of FIG. 4.

For example, referring to FIG. 5(a), when input shaft 2 rotates in an arrowed direction 83, lubricating fluid 85 spilled out from lubricating fluid spill ports 72a into rear end inside gap space 81b flows along outer peripheral surface 2a of input shaft 2 at first axial position 2b in an arrowed peripheral direction 84 that is relatively opposite to rotation direction 83 of input shaft 2 regardless of the rotary speed of motor assembly 6 relative to input shaft 2. In this regard, the rear end portion of roller retaining ring 79 and the rear end portions of needle rollers 78 defining rear end inside gap space 81b guide lubricating fluid 85 to rapidly flood outer peripheral surface 2a of input shaft 2 at first axial position 2b along with the rotation of input shaft 2. When lubricating fluid 85 spilled out from each lubricating fluid spill port 72a and flowing along outer peripheral surface 2a reaches other lubricating fluid spill port 72a, outer peripheral surface 2a of input shaft 2 at first axial position 2b is completely flooded with lubricating fluid 85 in the entire peripheral range thereof. Therefore, lubricating fluid 85 spilled from each lubricating fluid spill port 72a has to flow along outer peripheral surface 2a of input shaft 2 at first axial position 2b to only the half peripheral distance on input shaft 2 so as to cover the entire peripheral range on outer peripheral surface 2a of input shaft 2 at first axial position 2b. In this way, both opposite radial lubricating fluid spill ports 72a open at the common first axial position 2b quickly complete to flood outer peripheral surface 2a of input shaft 2 with lubricating fluid 85 spilled therefrom in the entire peripheral range.

Afterward, during rotation of input shaft 2, lubricating fluid 85 spilled out from lubricating fluid spill ports 72a overflows along outer peripheral surface 2a of input shaft 2 forward from first axial position 2b defined by rear end inside gap space 81b so as to flood rollable contact surfaces 78c of needle rollers 78 from rear end surface 78b to front end surface 78a, thereby forming fluid films over the entire outer peripheral surfaces of respective needle rollers 78, and thereby sufficiently lubricating entire needle rollers 78.

In this regard, each columnar needle roller 78 is crowned at the front and rear edges as mentioned above so as to reduce surface pressures against outer peripheral surface 2a of input shaft 2 at the front and rear edges thereof. Therefore, after lubricating fluid 85 spilled out from lubricating fluid spill ports 72a completely floods outer peripheral surface 2a of input shaft 2 at first axial position 2b in the whole peripheral range of input shaft 2, the rear crowned surface of each needle roller 78 which has the reduced surface pressure against outer peripheral surface 2a leads lubricating fluid 85 to smoothly flow along outer peripheral surface 2a of input shaft 2 forward from first axial position 2b. Further, each of crowned needle rollers 78 also has a reduced surface pressure against outer peripheral surface 2a of input shaft 2 at an axial middle portion of rollable contact surface 78c thereof. Therefore, the axial middle portion of each needle roller 78 having the reduced surface pressure leads further forward flow of lubricating fluid 85 along outer peripheral surface 2a of input shaft 2, thereby smoothly flooding rollable contact surface 78c of needle roller 78 with lubricating fluid 85 in the whole axial range of needle roller 78.

If lubricating fluid spill ports faced outside gap space 91 or 92 of needle roller bearing 28 in the outside of roller retaining ring 79 in the conventional way, lubricating fluid spilled out from the lubricating fluid spill ports into outside gap space 91 or 92 would have to be pressurized to enter front or rear end inside gap space 81a or 81b via narrow gap space 82a or 82b before reaching rollable contact surfaces 78c of needle rollers 78 in the inside of roller retaining ring 79 of needle roller bearing 28 distant from outside gap space 91 or 92 in the axial direction of input shaft 2. In this situation, lack of lubricating fluid supplied to needle rollers 78 of needle roller bearing 28 might occur because of sudden change of torque or rotary speed of motor assembly 6 caused by speed changing operation or so on or sudden speed reduction of input shaft 2 caused by heavy load on motor assembly 6.

On the contrary, lubricating fluid spill ports 72a disposed at first axial position 2b on outer peripheral surface 2a of input shaft 2 as shown in FIGS. 4, 5(a) and 5(b) face rear end inside gap space 81b of needle roller bearing 28 in the inside of roller retaining ring 79 so that lubricating fluid 85 spilled out from lubricating fluid spill ports 72a directly enters rear end inside gap space 81b so as to necessarily flood rollable contact surface 78c of needle rollers 78 in inside gap space 81 in the inside of roller retaining ring 79 regardless of the sudden change of torque or rotary speed of motor assembly 6 caused by speed changing operation or so on or the sudden speed reduction of input shaft 2 caused by heavy load on motor assembly 6, thereby developing the endurance of needle roller bearing 28 against wearing or damaging of needle rollers 78.

Alternative lubricating fluid passages 70A and 70B for lubricating needle roller bearing 28 will be described with reference to FIGS. 6(a), 6(b), 7(a) and 7(b). Description of members and portions designated by the same reference numerals as those used in the aforesaid embodiment shown in FIGS. 3, 4, 5(a) and 5(b) will be omitted because they are identical or similar to those designated by the same reference numerals in the aforesaid embodiment.

Figure 6:
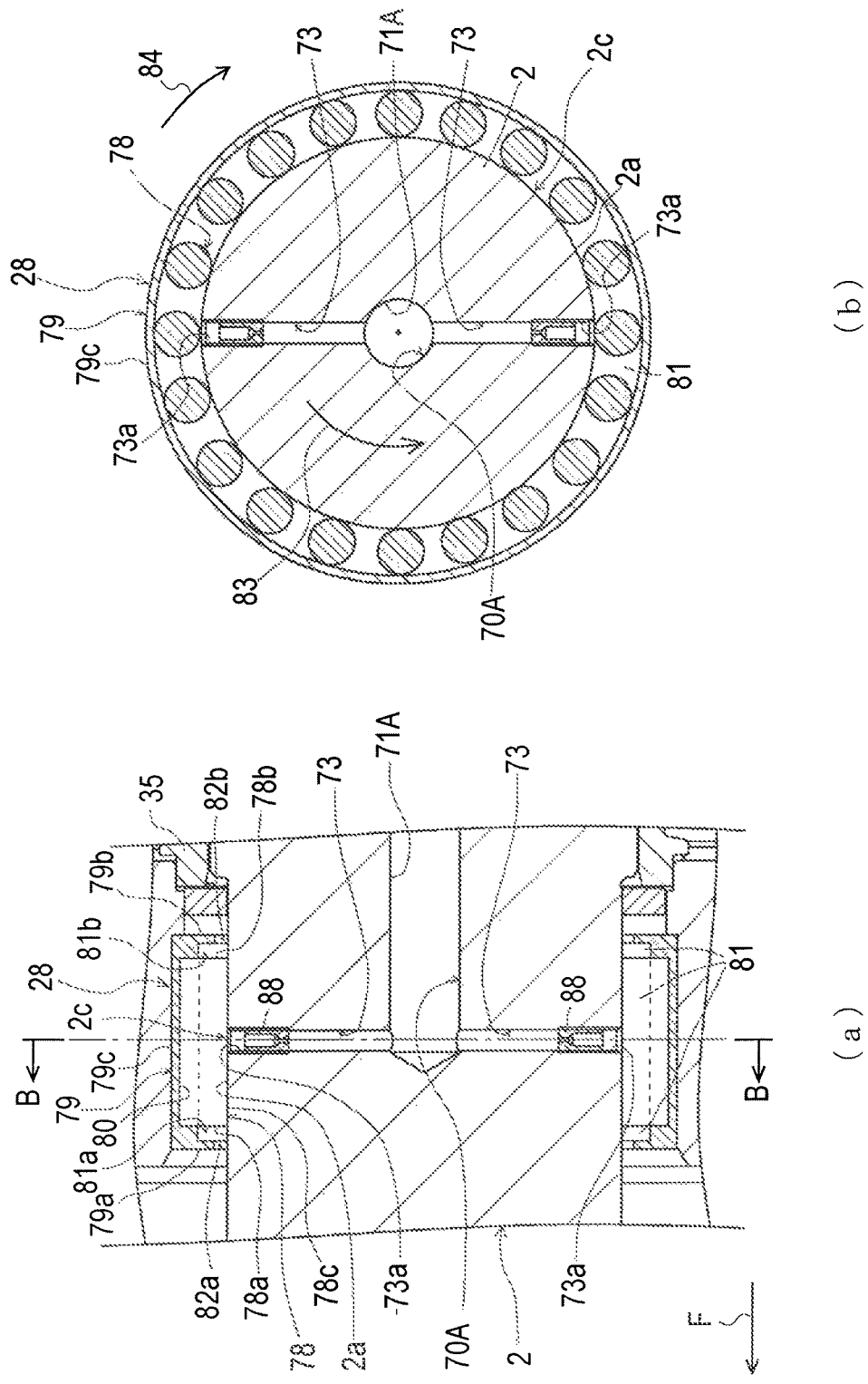
FIG. 6(a) is a fragmentary sectional side view of input shaft 2 provided with needle roller bearing 28 and a second lubricating fluid passage 70A for supplying lubricating fluid to needle roller bearing 28.
FIG. 6(b) is a cross sectional view taken along B-B line of FIG. 6(a).

Referring to an alternative embodiment shown in FIGS. 6(a) and 6(b), an alternative lubricating fluid passage 70A formed in input shaft 2 includes an alternative axial fluid passage 71A and a pair of alternative radial fluid passages 73. The front portion of axial fluid passage 43 extended forward from front charge relief valve 37 is defined as axial fluid passage 71A similar to axial fluid passage 71 except that axial fluid passage 71A is longer than axial fluid passage 71 so as to have a front end forward from the front end of axial fluid passage 71. Radial fluid passages 73 are extended radially from the front end of axial fluid passage 71A in the radial opposite directions and are provided with respective port members 88 so as to have respective lubricating fluid spill ports 73a disposed on outer peripheral surface 2a of input shaft 2 at a second axial position 2c forward from first axial position 2b of lubricating fluid spill ports 72a facing rear end inside gap space 81b of needle roller bearing 28.

Lubricating fluid spill ports 73a open at second axial position 2c on outer peripheral surface 2a of input shaft 2 face the axial middle portions of rollable contact surfaces 78c of needle rollers 78 at an axial middle portion of inside gap space 81. In other words, second axial position 2c of lubricating fluid spill ports 73a defines an axial middle portion of the inside section of the lubricated object. Therefore, during rotation of input shaft 2, lubricating fluid 85 spilled out from lubricating fluid spill ports 73a directly splashes on the axial middle portions of rollable contact surfaces 78c of needle rollers 78 and quickly expands toward both front and rear end surfaces 78a and 78b of needle rollers 78 in inside gap space 81 so as to flood entire needle rollers 78 in the axial direction of input shaft 2 and in the peripheral directions of respective needle rollers 78. In this regard, as mentioned above, the outer peripheral surface of each needle roller 78 is formed by crowning so that its axial middle portion has the reduced surface pressure against outer peripheral surface 2a of input shaft 2, thereby further smoothly expanding lubricating fluid 85 splashing on the axial middle portion of needle roller 78 toward front and rear end surfaces 78a and 78h to quickly flood entire needle rollers 78 in the peripheral directions of respective needle rollers 78 and in the axial direction of input shaft 2.

Further, lubricating fluid passage 70A having both opposite lubricating fluid spill ports 73a open at the common second axial position 2c has the same effect of quickly flooding outer peripheral surface 2a of input shaft 2 in the entire peripheral range of input shaft 2 with lubricating fluid 85 spilled from lubricating fluid spill ports 73a as the effect of lubricating fluid passage 70 having both opposite lubricating fluid spill ports 72a open at the common first axial position 2b. In this regard, the flow of lubricating fluid 85 spilled from lubricating fluid spill ports 72a at first axial position 2b along outer peripheral surface 2a in the peripheral direction according to rotation of input shaft 2 is mainly guided by the rear portion of roller retaining ring 79 defining rear end inside gap space 81b and is auxiliary guided by the rear end portions of needle rollers 78. On the contrary, the flow of lubricating fluid 85 spilled from lubricating fluid spill ports 73a at second axial position 2c along outer peripheral surface 2a in the peripheral direction according to rotation of input shaft 2 is mainly guided by needle rollers 78 at the axial middle portions thereof so that lubricating fluid 85 spreads in the axial direction of needle rollers 78 while flowing along outer peripheral surface 2a in the peripheral direction of input shaft 2, whereby the process of flooding needle rollers 78 in the entire axial range between front and rear end surfaces 78a and 78b with lubricating fluid 85 is performed simultaneously with the process of flooding outer peripheral surface 2a of input shaft 2 in the entire peripheral range with lubricating fluid 85, thereby further rapidly lubricating the entire needle rollers 78 along with rotation of input shaft 2.

Referring to an alternative embodiment shown in FIGS. 7(a) and 7(b), an alternative lubricating fluid passage 70B includes axial fluid passage 71A having the front end corresponding to second axial position 2C on outer peripheral surface 2a of input shaft 2, and includes radial fluid passage 72 and radial fluid passage 73. Radial fluid passages 72 and 73 of lubricating fluid passage 70B are radially opposite each other with respect to axial fluid passage 71A similar to those of each of lubricating fluid passages 70 and 70A, however, radial fluid passages 72 and 73 of lubricating fluid passage 70B are offset from each other in the axial direction of input shaft 2. Radial fluid passage 72 is extended from an axial intermediate portion of axial fluid passage 71A so that lubricating fluid spill port 72a of radial fluid passage 72 is open at first axial position 2b on outer peripheral surface 2a of input shaft 2 so as to face rear end inside gap space 81b of needle roller bearing 28 and the (crowned) rear end portions of rollable contact surfaces 78c of needle rollers 78, similar to lubricating fluid spill port 72a of lubricating fluid passage 70. Radial fluid passage 73 is extended from the front end of axial fluid passage 71A so that lubricating fluid spill port 73a of radial fluid passage 73 is open at second axial position 2c on outer peripheral surface 2a of input shaft 2 so as to face the axial middle portions of rollable contact surfaces 78c of needle rollers 78, similar to lubricating fluid spill port 73a of lubricating fluid passage 70A.

If needle rollers 78 of needle roller bearing 28 have eccentricity in the axial direction thereof at rollable contact surfaces 78c, lubricating fluid passage 70B having lubricating fluid spill ports 72a and 73a open at different first and second axial positions 2b and 2c is advantageous to such needle roller bearing 28. For example, even if the eccentricity causes the rear end portions of needle rollers 78 to have undesirably high surface pressures against outer peripheral surface 2a while the surface pressures of the axial middle portions of needle rollers 78 being normal, lubricating fluid 85 spilled from lubricating fluid spill port 72a at first axial position 2b directly splashes on the rear end portions of rollable contact surfaces 78c so as to reduce the surface pressures of the rear end portions of rollable contact surfaces 78c of needle rollers 78, thereby surely flooding rollable contact surfaces 78c of needle rollers 78 in the entire axial ranges of needle rollers 78. Conversely, if the axial middle portions of needle rollers 78 have undesirably high surface pressures caused by the electricity in the axial direction of needle rollers 78, lubricating fluid spill port 73a open at second axial position 2c has the benefit of reducing the surface pressures of the axial middle portions of needle rollers 78 with lubricating fluid 85 spilled from lubricating fluid spill port 73a and splashed on the axial middle portions of rollable contact surfaces 78c of needle rollers 78. Therefore, conceivable needle roller bearing 28 benefiting by lubricating fluid passage 70B has uncrowned needle rollers 78 that are liable to have eccentricity in the axial direction of needle rollers 78 at rollable contact surfaces 78c.

The arrangement of lubricating fluid spill ports 72a and 73a open at different axial positions 2b and 2c is rather advantageous for quickly flooding needle rollers 78 in the entire axial range of needle rollers 78 because of cooperation of spreading of lubricating fluid 85 from both axial offset lubricating fluid spill ports 72a and 73a in the axial direction of input shaft 2. However, the axial offset arrangement of lubricating fluid spill ports 72a and 73a does not seriously damage the above-mentioned effect of radially opposite lubricating fluid spill ports 72a and 73a for rapidly completing to flood outer peripheral surface 2a of input shaft 2 in the entire peripheral range because the axial offset distance between lubricating fluid spill ports 72a and 73a is small and lubricating fluid 85 spilled from each of lubricating fluid spill ports 72a and 73a at each of axial positions 2b and 2c is spread on outer peripheral surface 2a of input shaft 2 to some degrees in the axial direction of input shaft 2 so as to cover the small axial offset distance between lubricating fluid spill ports 72a and 73a while flowing along outer peripheral surface 2a of rotating input shaft 2 in the peripheral direction of input shaft 2.

Although the invention has been described in its preferred form with a certain degree of particularity, it is understood that the present disclosure of the preferred form can be changed in the details of construction, and the combination and arrangement of parts may be changed, without departing from the scope of the invention as hereinafter claimed.

For example, it is conceivable that another alternative lubricating fluid passage is formed in input shaft 2 so as to include axial fluid passage 71A, a pair of opposite radial fluid passages 72 that are extended from the axial intermediate portion of axial fluid passage 71A to have respective lubricating fluid spill ports 72a at first axial position 2b, and a pair of opposite radial fluid passages 73 that are extended from the front end of axial fluid passage 71A to have respective lubricating fluid spill ports 73a at second axial position 2c. Further, an alternative or additional lubricating fluid spill port may be open at outer peripheral surface 2a of input shaft 2 at another axial position so as to face front end inside gap space 81a of needle roller bearing 28. Further, any of the above-mentioned lubricating fluid supply systems may be provided for lubricating another roller bearing than the needle roller bearing.

Further, input shaft 2 formed therein with lubricating fluid passage 70, 70A or 70B may be adapted to an alternative HST including two plunger blocks: a pump plunger block containing pump plungers so as to serve as a hydraulic pump; and a motor plunger block containing motor plungers so as to serve as a hydraulic motor. In this case, input shaft 2 may serve as a pump shaft fixedly provided thereon with the pump plunger block.

What is claimed is:

1. A hydrostatic transmission comprising:
   an input shaft, wherein axial and radial directions of any component or portion in the hydrostatic transmission are defined to coincide to axial and radial directions of the input shaft;
   a plunger block fixed on the input shaft;
   pump plungers disposed in the plunger block;
   a pump swash plate disposed on one axial side of the plunger block so as to contact heads of the pump plungers projecting from the plunger block;
   a hydraulic motor driven by hydraulic fluid pressurized by the pump plungers rotating together with the plunger block and the input shaft;
   a lubricated object; and
   a lubricating fluid passage formed in the input shaft and having a pair of radially opposite lubricating fluid spill ports open at an outer peripheral surface of the input shaft,
   wherein both of the radially opposite lubricating fluid spill ports face the lubricated object,
   wherein the lubricating fluid passage includes an axial fluid passage extended axially and a pair of radial fluid passages extended radially from the axial fluid passage to the outer peripheral surface of the input shaft so as to be radially opposite each other,
   wherein open ends of the respective radial fluid passages at the outer peripheral surface of the input shaft serve as the respective radially opposite lubricating fluid spill ports, and
   wherein the radially opposite lubricating fluid spill ports are disposed at different axial positions.

2. The hydrostatic transmission according to claim 1, wherein the lubricated object has opposite axial end potions and an inside section between the axial end portions, wherein one of the lubricating fluid spill ports disposed at one of the different axial positions faces the inside section of the lubricated object adjacent to one of the axial end portions of the lubricated object, and the other of the lubricating fluid spill ports disposed at the other of the different axial positions faces an axial middle portion of the inside section of the lubricated object.

3. The hydrostatic transmission according to claim 1, further comprising:
   motor plungers disposed in the plunger block so as to be fluidly connected to the pump plungers; and
   a motor swash plate disposed on another axial side of the plunger block opposite the pump swash plate and contacting heads of the motor plungers projecting from the plunger block so as to constitute the hydraulic motor,
   wherein the lubricated object is a bearing disposed on the outer peripheral surface of the input shaft so as to support the motor swash plate.

4. A hydrostatic transmission comprising:
   an input shaft, wherein axial and radial directions of any component or portion in the hydrostatic transmission are defined to coincide to axial and radial directions of the input shaft;
   a plunger block fixed on the input shaft;
   pump plungers and motor plungers disposed in the plunger block;
   a pump swash plate disposed on one axial side of the plunger block so as to contact heads of the pump plungers projecting from the plunger block;
   a motor swash plate disposed on another axial side of the plunger block opposite the pump swash plate so as to contact heads of the motor plungers projecting from the plunger block;
   a roller bearing interposed between an outer peripheral surface of the input shaft and an inner peripheral surface of the motor swash plate, wherein the roller bearing includes rollers and a roller retaining ring that holds the rollers in the inside thereof, wherein the rollers contact the outer peripheral surface of the input shaft, wherein the roller retaining ring contacts the inner peripheral surface of the motor swash plate at an outer peripheral surface thereof, and wherein the roller bearing has an inside gap space in the inside of the roller retaining ring along the outer peripheral surface of the input shaft to accommodate the rollers;
   a lubricating fluid passage formed in the input shaft and having a lubricating fluid spill port open at the outer peripheral surface of the input shaft, wherein the lubricating fluid spill port faces the inside gap space of the roller bearing,
   wherein the lubricating fluid passage includes an axial fluid passage extended axially and a pair of radial fluid passages extended radially from the axial fluid passage to the outer peripheral surface of the input shaft so as to be radially opposite each other, and wherein each of open ends of the radial fluid passages at the outer peripheral surface of the input shaft serves as the lubricating fluid spill port, and wherein the radially opposite lubricating fluid spill ports are disposed at different axial positions.

5. The hydrostatic transmission according to claim 4, wherein one of the lubricating fluid spill ports disposed at one of the different axial positions faces an axial end portion of the inside gap space of the roller bearing between an axial end of the roller retaining ring and an axial end of each of the rollers, and the other of the lubricating fluid spill ports disposed at the other of the different axial positions faces an axial middle portion of each of the rollers in the inside gap space.

6. The hydrostatic transmission according to claim 4, wherein each of the rollers of the roller bearing has its own axis that is extended in the axial direction of the input shaft.

* * * * *